United States Patent
Hirakawa et al.

(10) Patent No.: US 11,624,009 B2
(45) Date of Patent: Apr. 11, 2023

(54) ADHESIVE COMPOSITION, AND COVERLAY FILM, BONDING SHEET, COPPER-CLAD LAMINATE AND ELECTROMAGNETIC SHIELDING MATERIAL, EACH USING SAID ADHESIVE COMPOSITION

(71) Applicant: TOAGOSEI CO., LTD., Minato-ku (JP)

(72) Inventors: Makoto Hirakawa, Nagoya (JP); Masashi Yamada, Nagoya (JP)

(73) Assignee: TOAGOSEI CO., LTD., Minato-ku (JP)

( * ) Notice: Subject to any disclaimer, the term of this patent is extended or adjusted under 35 U.S.C. 154(b) by 727 days.

(21) Appl. No.: 16/470,767

(22) PCT Filed: Dec. 15, 2017

(86) PCT No.: PCT/JP2017/045038
§ 371 (c)(1),
(2) Date: Jun. 18, 2019

(87) PCT Pub. No.: WO2018/116967
PCT Pub. Date: Jun. 28, 2018

(65) Prior Publication Data
US 2020/0079980 A1 Mar. 12, 2020

(30) Foreign Application Priority Data
Dec. 22, 2016 (JP) .............................. JP2016-249501

(51) Int. Cl.
| | | |
|---|---|---|
| *C09J 151/06* | (2006.01) | |
| *C08K 5/49* | (2006.01) | |
| *C09J 7/00* | (2018.01) | |
| *C09J 123/10* | (2006.01) | |
| *C09J 163/04* | (2006.01) | |
| *C08K 5/544* | (2006.01) | |
| *C08K 3/013* | (2018.01) | |
| *B32B 15/088* | (2006.01) | |
| *C08K 3/04* | (2006.01) | |
| *C08K 3/08* | (2006.01) | |
| *C08K 5/00* | (2006.01) | |
| *C08K 5/09* | (2006.01) | |

(52) U.S. Cl.
CPC ........... *C09J 151/06* (2013.01); *B32B 15/088* (2013.01); *C08K 3/013* (2018.01); *C08K 3/04* (2013.01); *C08K 3/08* (2013.01); *C08K 5/005* (2013.01); *C08K 5/09* (2013.01); *C08K 5/49* (2013.01); *C08K 5/5477* (2021.01); *C09J 7/00* (2013.01); *C09J 123/10* (2013.01); *C09J 163/04* (2013.01); *B32B 2250/02* (2013.01); *B32B 2457/00* (2013.01); *C08K 2003/085* (2013.01); *C08K 2003/0806* (2013.01); *C08K 2003/0812* (2013.01)

(58) Field of Classification Search
CPC ............. B32B 15/088; B32B 2250/02; B32B 2457/08; C09J 151/06; C09J 7/00; C09J 7/22; C09J 7/30; C09J 2423/00; C09J 2463/00; C09J 123/10; C09J 163/04; C09J 9/02; C09J 11/00; C09J 11/04; C09J 11/06; C09J 123/26; C09J 161/04; C09J 2203/326; C08K 3/013; C08K 5/005; C08K 5/09; C08K 5/49; C08K 5/5477; C08K 2003/0806; C08K 2003/0812; C08K 2003/085; C08K 2201/001
See application file for complete search history.

(56) References Cited

U.S. PATENT DOCUMENTS

| | | | |
|---|---|---|---|
| 9,079,378 B2 | 7/2015 | Kammuri | |
| 10,471,682 B2* | 11/2019 | Okimura | ................ C09J 123/26 |
| 2005/0059754 A1* | 3/2005 | Lunt | ....................... C09J 11/04 |
| | | | 523/210 |
| 2012/0090887 A1 | 4/2012 | Kanmuri | |
| 2016/0036013 A1 | 2/2016 | Nakazato et al. | |
| 2017/0088753 A1 | 3/2017 | Nakamura et al. | |
| 2017/0096586 A1 | 4/2017 | Sakata et al. | |
| 2017/0297302 A1 | 10/2017 | Okimura et al. | |

FOREIGN PATENT DOCUMENTS

| | | |
|---|---|---|
| CN | 102359794 A | 3/2012 |
| CN | 103108533 A | 5/2013 |
| CN | 103571215 A | 2/2014 |
| CN | 104023511 A | 9/2014 |

(Continued)

OTHER PUBLICATIONS

Office Action dated Oct. 20, 2020 in corresponding Japanese Patent Application No. 2018-557728 (with English Translation), 11 pages.
Combined Chinese Office Action and Search Report dated Aug. 27, 2020, in Patent Application No. 201780076998.5 (with English translation), 18 pages.
International Search Report dated Jan. 23, 2018 in PCT/JP2017/045038 filed on Dec. 15, 2017.
Combined Chinese Office Action and Search Report dated May 7, 2021 in Chinese Patent Application No. 201780076998.5 (with English translation), 21 pages.

(Continued)

*Primary Examiner* — Scott R. Walshon
(74) *Attorney, Agent, or Firm* — Oblon, McClelland, Maier & Neustadt, L.L.P.

(57) ABSTRACT

An adhesive composition containing (A) a modified polyolefin resin and (B) an epoxy compound, wherein the modified polyolefin resin (A) is a polyolefin resin graft modified with a modifying agent that contains an α,β-unsaturated carboxylic acid or a derivative thereof. The content of the epoxy compound (B) is 1-20 parts by mass relative to 100 parts by mass of the modified polyolefin resin (A); and the epoxy compound is composed of two or more types of epoxy compounds.

15 Claims, No Drawings

(56) References Cited

FOREIGN PATENT DOCUMENTS

| | | |
|---|---|---|
| CN | 104582246 A | 4/2015 |
| CN | 105315934 A | 2/2016 |
| CN | 105658753 A | 6/2016 |
| JP | 7-235767 A | 9/1995 |
| JP | 10-17685 A | 1/1998 |
| JP | 10-60401 A | 3/1998 |
| JP | 2001-354936 A | 12/2001 |
| JP | 2007-2121 A | 1/2007 |
| JP | 2007-251138 A | 9/2007 |
| JP | 2014-208764 A | 11/2014 |
| JP | 5700166 B1 | 4/2015 |
| JP | 2016-89090 A | 5/2016 |
| JP | 2016-151046 A | 8/2016 |
| TW | 201606013 A | 2/2016 |
| TW | 201610048 A | 3/2016 |
| WO | WO 2015/190411 A1 | 12/2015 |
| WO | WO 2016/042837 A1 | 3/2016 |
| WO | WO 2016/047289 A1 | 3/2016 |
| WO | WO-2016047289 A1 * 3/2016 ............. B32B 15/08 |

OTHER PUBLICATIONS

Korean Office Action dated Nov. 23, 2021 in Korean Patent Application No. 10-2019-7019698 (with unedited computer generated English translation), 10 pages.
Combined Taiwanese Office Action and Search Report dated Feb. 8, 2021 in Taiwanese Patent Application No. 106144786 (with English translation), 12 pages.

* cited by examiner

ADHESIVE COMPOSITION, AND COVERLAY FILM, BONDING SHEET, COPPER-CLAD LAMINATE AND ELECTROMAGNETIC SHIELDING MATERIAL, EACH USING SAID ADHESIVE COMPOSITION

TECHNICAL FIELD

The present invention relates to an adhesive composition excellent in adhesiveness, solder heat resistance and dielectric properties and suitable for adhesion of electronic parts, and to a coverlay film, a bonding sheet, a copper-clad laminated board and an electromagnetic shielding material using the composition.

BACKGROUND ART

In recent years, the demand for flexible printed wiring board-related products (hereinafter, referred to also as "FPC (Flexible Printed Circuit)-related products") is increasing with diversification of electronic devices including reduction in size and increase in density. Examples of FPC-related products include a flexible copper-clad laminated board in which a polyimide film and a copper foil are bonded together, a flexible printed wiring board obtained by forming a circuit on a flexible copper-clad laminated board, a flexible printed wiring board with a reinforcing plate in which a flexible printed wiring board and a reinforcing plate are bonded together, a multilayer board in which flexible copper-clad laminated boards or flexible printed wiring boards are stacked and laminated, a flexible flat cable in which a copper wiring is bonded to a base film, and the like. In the manufacture of a flexible copper-clad laminated board among these products, an adhesive is usually used to adhere a polyimide film and a copper foil to each other.

In the manufacture of a flexible printed wiring board, a film called a "coverlay film" is normally used in order to protect a wiring portion. This coverlay film is provided with an insulating resin layer and an adhesive layer formed on a surface thereof, and a polyimide resin composition is widely used for formation of the insulating resin layer. For example, a flexible printed wiring board is manufactured by bonding a coverlay film onto its face having a wiring portion through an adhesive layer by using heat press or the like. At this time, the adhesive layer of the coverlay film needs to have strong adhesiveness to both the wiring portion and the film base layer.

As a printed wiring board, a build-up type multilayer printed wiring board is known in which conductor layers and organic insulating layers are alternately laminated on a surface of a substrate. In the case of manufacturing such a multilayer printed wiring board, an insulating adhesive layer forming material, called a "bonding sheet", is used in order to join the conductor layers and the organic insulating layers. The insulating adhesive layers need to have embeddability in the wiring portion and strong adhesiveness to both the organic insulating layers (such as a polyimide resin) and the constituent material (such as copper) for the conductor parts that form the circuit.

An epoxy-based adhesive composition containing an epoxy resin and a thermoplastic resin having high reactivity with the epoxy resin is proposed as an adhesive used in such FPC-related products.

For example, Patent Document 1 discloses a technique using an adhesive containing an epoxy-based adhesive as a main component and further containing an olefin-acid-based ester copolymer rubber and a curing agent. Specifically, an ethylene-acrylic acid ester copolymer rubber/epoxy resin-based adhesive is used.

Patent Document 2 discloses an adhesive composition for a flexible wiring board containing: (A) a bisphenol type epoxy resin having an epoxy equivalent of 1,000 or less; (B) a novolak type epoxy resin having an epoxy equivalent of 200 to 500; (C) a thermoplastic elastomer having an epoxy equivalent of 400 to 2,500 and a weight average molecular weight of 20,000 or more, having a glycidyl group in the molecular chain other than the molecular terminal, and also having a unit derived from styrene; (D) a bisphenol type epoxy resin or phenoxy resin having a weight average molecular weight of 10,000 or more; (E) an epoxy resin curing agent; (F) a curing accelerator; (G) an inorganic filler; and (H) a solvent. Specifically, a glycidyl group-containing thermoplastic elastomer/epoxy resin-based adhesive is used.

Patent Document 3 discloses an epoxy-based adhesive containing a base resin that contains an epoxy resin and a styrene-maleic acid copolymer. The adhesive compositions described in these documents realize a rapid curing reaction by utilizing the reactivity of the carboxy group contained in the rubber or elastomer component with the epoxy resin, and are also excellent in adhesiveness.

Further, Patent Document 4 discloses, an epoxy resin composition containing, as essential components, (I) an epoxy resin having two or more epoxy groups in one molecule; (II) a copolymer resin containing an aromatic vinyl compound and a maleic anhydride as essential components; and (III) a phenol compound having two phenolic hydroxyl groups in one molecule, as an adhesive used for manufacturing a prepreg.

In addition to the conventional adhesive function, the adhesives are also increasingly requested to have functions such as heat dissipation and conductivity, and, in order to achieve the request, a large amount of an inorganic filler is sometimes added to the adhesives.

PRIOR TECHNICAL DOCUMENT

Patent Document

[Patent Document 1] JP-A H07-235767
[Patent Document 2] JP-A 2001-354936
[Patent Document 3] JP-A 2007-2121
[Patent Document 4] JP-A H10-17685

SUMMARY OF THE INVENTION

Problems that the Invention is to Solve

In recent years, mobile communication devices such as mobile phones and information equipment terminals for which the demand is rapidly expanding are required to process a large quantity of data at a high speed, and therefore, the increasing of the signal frequency is advancing. With increasing signal speed and signal frequency, the adhesives used in FPC-related products are required to give a cured material (cured product) having excellent dielectric properties (low dielectric constant and low dielectric loss tangent) in a high frequency region after adhesion.

However, the cured products of the adhesive compositions described in the documents do not have sufficient dielectric properties in an ultrahigh frequency microwave band (1 to 3 GHz).

In addition, the solder heat resistance at a reflow temperature of about 260° C. is required of the printed wiring board, as solder materials used when mounting electronic parts and the like are increasingly designed to be lead-free. For example, even after a flexible copper-clad laminated board obtained by joining a polyimide film and a gold-plated copper foil using an adhesive has been subjected to a reflow process, it is required to hold a good adhesion state.

An object of the present invention is to provide an adhesive composition which not only has good adhesiveness to various articles such as a film containing a polyimide resin and a foil containing a metal including copper or an alloy, but also gives a cured product having excellent dielectric properties. Further, another object of the present invention is to provide an adhesive composition capable of imparting solder heat resistance to a precursor such as a flexible copper-clad laminated board used for manufacturing an FPC-related product by applying a reflow process.

Means for Solving the Problems

The present inventors found that an adhesive composition containing a modified polyolefin-based resin having a specific structure and at least two kinds of epoxy resins and having a specific total content proportion of the epoxy resins provides not only excellent adhesiveness, but also excellent dielectric properties and solder heat resistance to complete the present invention.

The present invention is as follows.
1. An adhesive composition comprising (A) a modified polyolefin-based resin and (B) an epoxy resin, characterized in that the modified polyolefin-based resin (A) is a resin in which a polyolefin resin is graft-modified with a modifier containing an $\alpha,\beta$-unsaturated carboxylic acid or a derivative thereof, that a content of the epoxy resin (B) is in a range from 1 to 20 parts by mass based on 100 parts by mass of the modified polyolefin-based resin (A), and that the epoxy resin (B) comprises two or more types of epoxy resins.
2. The adhesive composition according to 1 above, wherein the epoxy resin (B) comprises a novolak type epoxy resin.
3. The adhesive composition according to 2 above, wherein the epoxy resin (B) comprises a bisphenol A novolak type epoxy resin.
4. The adhesive composition according to any one of 1 to 3 above, wherein the epoxy resin (B) comprises an epoxy resin having an alicyclic skeleton.
5. The adhesive composition according to any one of 1 to 4 above, wherein the modified polyolefin-based resin (A) comprises a modified polypropylene resin.
6. The adhesive composition according to any one of 1 to 5 above, wherein the derivative of the $\alpha, \beta$-unsaturated carboxylic acid is at least one compound selected from a group consisting of an itaconic anhydride, a maleic anhydride, an aconitic anhydride and a citraconic anhydride.
7. The adhesive composition according to any one of 1 to 6 above, wherein a content proportion of a graft portion derived from the $\alpha,\beta$-unsaturated carboxylic acid or the derivative thereof is in a range from 0.1% to 20% by mass based on 100% by mass of the modified polyolefin-based resin.
8. The adhesive composition according to any one of 1 to 7 above, further comprising (C) an imidazole-based compound having an alkoxysilyl group, a content of the alkoxysilyl group-containing imidazole-based compound (C) being in a range from 0.3 to 5 parts by mass based on 100 parts by mass of a total content of the modified polyolefin-based resin (A) and the epoxy resin (B).
9. The adhesive composition according to any one of 1 to 8 above, further comprising (D) an antioxidant, a content of the antioxidant (D) being in a range from 0.1 to 10 parts by mass based on 100 parts by mass of a total content of the modified polyolefin-based resin (A) and the epoxy resin (B).
10. The adhesive composition according to any one of 1 to 9 above, further comprising (E) a phosphorus-containing compound (E), a content of the phosphorus-containing compound (E) being in a range from 0.5 to 50 parts by mass based on 100 parts by mass of a total content of the modified polyolefin-based resin (A) and the epoxy resin (B).
11. The adhesive composition according to any one of 1 to 10 above, further comprising (F) a conductive filler, a content of the conductive filler (F) being in a range from 10 to 350 parts by mass based on 100 parts by mass of a total content of the modified polyolefin-based resin (A) and the epoxy resin (B).
12. A coverlay film comprising an adhesive layer formed using the adhesive composition according to any one of 1 to 11 above, the adhesive layer being formed on one side of a polyimide film.
13. A bonding sheet comprising an adhesive layer formed using the adhesive composition according to any one of 1 to 11 above, the adhesive layer being formed on a surface of a releasable film.
14. A copper-clad laminated board comprising an adhesive layer formed using the adhesive composition according to any one of 1 to 11 above, the adhesive layer being provided between a copper foil and at least one side of a polyimide film.
15. An electromagnetic shielding material comprising an adhesive layer formed using the adhesive composition according to any one of 1 to 11 above, as an element.

Effects of the Invention

The adhesive composition of the present invention not only has excellent adhesiveness to various articles such as a film containing a polyimide resin and a foil containing a metal including copper or an alloy, but also gives a cured product having excellent dielectric properties (low dielectric constant and low dielectric loss tangent). In addition, the adhesive composition of the present invention can impart solder heat resistance to a precursor used for manufacturing an FPC-related product by applying a reflow process. Therefore, the adhesive composition of the present invention and laminates with an adhesive layer formed using the composition, such as a bonding sheet, a coverlay film and a copper-clad laminated board, are suitable, for example, for manufacturing FPC-related products.

EMBODIMENTS FOR CARRYING OUT THE INVENTION

Hereinafter, embodiments of the present invention are described.
1. Adhesive Composition
The adhesive composition of the present invention is an adhesive composition containing (A) a modified polyolefin-based resin and (B) an epoxy resin, and is characterized in that the modified polyolefin-based resin (A) is a resin in which a polyolefin resin is graft-modified with a modifier containing an $\alpha,\beta$-unsaturated carboxylic acid or a derivative thereof, that a content of the epoxy resin (B) is in a range from 1 to 20 parts by mass based on 100 parts by mass of the modified polyolefin-based resin (A), and that the epoxy resin (B) comprises two or more types of epoxy resins. The adhesive composition of the present invention may further contain a solvent, an additive and the like.

The modified polyolefin-based resin (A) is a resin having a portion derived from a polyolefin resin and a graft portion derived from a modifier, and is preferably a resin soluble in a solvent which will be described later.

The modified polyolefin-based resin (A) is preferably obtained by graft polymerization of a modifier containing an α,β-unsaturated carboxylic acid or a derivative thereof in the presence of a polyolefin resin. The manufacture of the modified polyolefin-based resin (A) through graft polymerization can be performed by a known method, and a radical initiator may be used in the manufacture. Examples of a specific manufacturing method for the modified polyolefin-based resin (A) include a solution method involving heating and dissolving a polyolefin resin in a solvent such as toluene and adding a modifier and a radical initiator; a melting method involving melting and kneading a polyolefin resin, a modifier and a radical initiator using Banbury mixer, a kneader, an extruder or the like; and the like. In the case of the melting method, a method of using the polyolefin resin, the modifier and the radical initiator is not particularly limited, and these components may be added all at once or successively to the reaction system.

In the case of manufacturing the modified polyolefin-based resin (A), a stabilizer to adjust the stability of a resin, a modification aid for improving the grafting efficiency of the modifier containing an α,β-unsaturated carboxylic acid or a derivative thereof, and the like may further be used.

The polyolefin resin to be subjected to graft polymerization is not particularly limited as long as it has a structural unit derived from an olefin. The polyolefin resin used is preferably a homopolymer or copolymer of an olefin having 2 to 20 carbon atoms such as ethylene, propylene, butene, pentene, hexene, heptene, octene and 4-methyl-1-pentene. In the present invention, a homopolymer or copolymer of an olefin having 2 to 6 carbon atoms are particularly preferred. A content proportion of the structural unit derived from the olefin in the polyolefin resin can be arbitrarily selected. The polyolefin resin to be subjected to graft polymerization may be either a modified polyolefin resin or a non-modified polyolefin resin. When adhesion to a poorly adhesive adherend is carried out using the adhesive composition of the present invention, the modified polyolefin-based resin (A) is preferably a modified product of a non-modified polyolefin resin, and more preferably contains a modified resin of an ethylene-propylene copolymer, a propylene-butene copolymer or an ethylene-propylene-butene copolymer, that is, a modified polypropylene resin. In this case, an adhesive composition containing a modified polypropylene resin obtained using a polyolefin resin having a propylene unit content proportion of 50 mol % or more can provide further excellent adhesiveness. Therefore, the polyolefin resin particularly preferably contains a polypropylene in the present invention. When an adhesive composition containing a modified polyolefin-based resin (A) obtained using a polyolefin resin having a propylene unit content proportion of 50 mol % or more is used, for example, flexibility can be imparted to the adhesion part (adhesive layer) after adhesion of two members. Molecular weight of the polyolefin resin is not particularly limited.

The modifier includes at least one compound of an α,β-unsaturated carboxylic acid and the derivative thereof. Examples of the α,β-unsaturated carboxylic acid include maleic acid, fumaric acid, tetrahydrophthalic acid, itaconic acid, citraconic acid, crotonic acid, aconitic acid, norbornene carboxylic acid, and the like. Examples of the derivative of the α,β-unsaturated polycarboxylic acid include an acid anhydride, an acid halide, an amide, an imide, an ester, and the like. Preferable modifiers are itaconic anhydride, maleic anhydride, aconitic anhydride, and citraconic anhydride. Among these, itaconic anhydride and maleic anhydride are particularly preferred from a viewpoint of adhesiveness. The modifier used may be at least one type selected from α,β-unsaturated carboxylic acids and derivatives thereof. A combination of at least one type of α,β-unsaturated carboxylic acid and at least one type of derivative thereof, a combination of two or more types of α,β-unsaturated carboxylic acids or a combination of two or more types of derivatives of α,β-unsaturated carboxylic acids can also be used.

The modifier according to the present invention may contain other compounds (other modifiers) in addition to the α,β-unsaturated carboxylic acid and the like, depending on the purpose. Examples of other compounds (other modifiers) include acrylic acid or methacrylic acid (hereinafter, "acrylic" and/or "methacrylic" are/is referred to as "(meth) acrylic"), derivatives of the (meth)acrylic acid, an aromatic vinyl compound, cyclohexyl vinyl ether, and the like. These other compounds may be used singly or in combination of two or more types thereof.

A (meth)acrylic acid ester represented by the following general formula (1) can be used as the derivative of the (meth)acrylic acid described above.

$$CH_2=CR^1COOR^2 \quad (1)$$

(In the formula, $R^1$ is a hydrogen atom or a methyl group, and $R^2$ is a hydrocarbon group.)

In the general formula (1), $R^1$ is a hydrogen atom or a methyl group, and preferably a methyl group. $R^2$ is a hydrocarbon group, and preferably an alkyl group having 8 to 18 carbon atoms, a cycloalkyl group having 8 to 18 carbon atoms, or an aryl group having 8 to 18 carbon atoms.

Examples of the compound represented by the general formula (1) include methyl (meth)acrylate, ethyl (meth) acrylate, propyl (meth)acrylate, butyl (meth)acrylate, pentyl (meth)acrylate, hexyl (meth)acrylate, heptyl (meth)acrylate, octyl (meth)acrylate, decyl (meth)acrylate, lauryl (meth) acrylate, tridecyl (meth)acrylate, stearyl (meth)acrylate, cyclohexyl (meth)acrylate, benzyl (meth)acrylate, and the like. These compounds may be used singly or in combination of two or more types thereof. In the present invention, it is preferable that other modifiers contain a (meth)acrylic acid ester having an alkyl group with 8 to 18 carbon atoms, because the heat resistant adhesiveness is improved. The preferable (meth)acrylic acid ester having an alkyl group with 8 to 18 carbon atoms is octyl (meth)acrylate, lauryl (meth)acrylate, tridecyl (meth)acrylate, or stearyl (meth) acrylate in particular.

Examples of the derivatives of the (meth)acrylic acid include hydroxyethyl (meth)acrylate, glycidyl (meth)acrylate, isocyanate-group containing (meth)acrylic acid, and the like.

Examples of the aromatic vinyl compound include styrene, o-methylstyrene, p-methylstyrene, α-methylstyrene, and the like.

When the α,β-unsaturated carboxylic acid or a derivative thereof is used with another modifier as the modifier, it is possible to improve the graft ratio due to the modifier, to improve the solubility of the obtained modified polyolefin-based resin (A) in a solvent, and to further improve the adhesiveness due to the adhesive composition containing this modified polyolefin-based resin (A).

As described above, the modified polyolefin-based resin (A) has at least a graft portion derived from the modifier. Hereinafter, the content proportion of the graft portion contained in the modified polyolefin-based resin (A) (hereinafter, also referred to as "graft mass") will be described.

The modified polyolefin-based resin (A) has a graft portion derived from an α,β-unsaturated carboxylic acid or a derivative thereof. In the modified polyolefin-based resin (A), the graft mass of the graft portion derived from an α,β-unsaturated carboxylic acid or a derivative thereof is preferably in a range from 0.1% to 20% by mass, and more preferably from 0.2% to 18% by mass based on 100% by mass of the modified polyolefin-based resin (A) from a viewpoint of adhesiveness of the adhesive composition. When the graft mass is 0.1% by mass or more, the solubility of the modified polyolefin-based resin (A) in a solvent is excellent, and the adhesiveness to an adherend made of a metal or the like is particularly excellent. Moreover, when the graft mass is 20% by mass or less, the adhesiveness to an adherend made of a resin or the like is particularly excellent.

The graft mass of the graft portion derived from an α,β-unsaturated carboxylic acid or a derivative thereof in the modified polyolefin-based resin (A) can be determined by alkali titration method. When the derivative of the α,β-unsaturated carboxylic acid is an imide having no acid group or the like, the graft mass can be determined by Fourier transform infrared spectroscopy.

When the modified polyolefin-based resin (A) contains a graft portion derived from a (meth)acrylic acid ester represented by the general formula (1) as another modifier, the graft mass is preferably in a range from 0.1% to 30% by mass, and more preferably from 0.3% to 25% by mass based on 100% by mass of the modified polyolefin-based resin (A). When the graft mass of the graft portion derived from the (meth)acrylic acid ester is in a range from 0.1% to 30% by mass, the solubility of the modified polyolefin-based resin (A) in a solvent is excellent, and the adhesive composition, when containing other resins or elastomers described later, is excellent in compatibility therewith, and can further improve the adhesiveness to an adherend.

When the graft portion includes a graft portion derived from a (meth)acrylic acid ester represented by the general formula (1), the graft mass of the graft portion in the obtained modified polyolefin-based resin (A) can be determined by Fourier transform infrared spectroscopy.

When the modified polyolefin-based resin (A) is manufactured using a radical initiator, the radical initiator may be suitably selected from known substances. In the present invention, an organic peroxide such as benzoyl peroxide, dicumyl peroxide, lauroyl peroxide, di-t-butyl peroxide, 2,5-dimethyl-2,5-di(t-butylperoxy) hexane, and cumene hydroperoxide is preferably used.

When manufacturing the modified polyolefin-based resin (A), a modification aid, a stabilizer, and the like may be used. Examples of the modification aid include divinylbenzene, hexadiene, dicyclopentadiene, and the like. Examples of the stabilizer include hydroquinone, benzoquinone, nitrosophenyl hydroxy compounds, and the like.

The weight average molecular weight (Mw) of the modified polyolefin-based resin (A) is preferably in a range from 30,000 to 250,000, and more preferably from 50,000 to 200,000. When the weight average molecular weight (Mw) ranges from 30,000 to 250,000, the adhesive composition is excellent in solvent solubility and initial adhesiveness to an adherend, and further, excellent in solvent resistance to an adhesion part after adhesion.

The acid value of the modified polyolefin-based resin (A) is preferably in a range from 0.1 to 50 mg KOH/g, more preferably from 0.5 to 40 mg KOH/g, and further preferably from 1.0 to 30 mg KOH/g. When the adhesive composition containing the modified polyolefin-based resin (A) having an acid value of 0.1 to 50 mg KOH/g is used, a sufficiently cured adhesion part can be formed, and good adhesiveness, heat resistance and resin flowability can be obtained.

In the adhesive composition of the present invention, a content of the modified polyolefin-based resin (A) is preferably 50% by mass or more, and more preferably 60% by mass or more based on 100% by mass of the solid content (excluding the solvent) of the adhesive composition. The upper limit is preferably 99% by mass. An adhesive composition having a content of the modified polyolefin-based resin (A) of less than 50% by mass may not provide flexibility of the formed adhesive layer, and deformation such as warpage may occur in the obtained integrated product.

The epoxy resin (B) is a component which reacts with a carboxy group in the modified polyolefin-based resin (A) under a heating condition of about 100° C. to 200° C., thereby developing high adhesiveness of the reaction product to an adherend and heat resistance exerted by a cured product containing the reaction product.

The epoxy resin (B) is preferably one having two or more epoxy groups in one molecule. Example thereof includes a bisphenol type epoxy resin such as a bisphenol A type epoxy resin, a bisphenol F type epoxy resin, a bisphenol S type epoxy resin, and a brominated bisphenol A type epoxy resin; an epoxy resin having an alicyclic skeleton such as a hydrogenated product of the bisphenol type epoxy resin and a dicyclopentadiene skeleton-containing epoxy resin; a novolak type epoxy resin such as a phenol novolak type epoxy resin, an o-cresol novolak type epoxy resin, and a bisphenol A novolak type epoxy resin; a glycidyl ester-based epoxy resin such as orthophthalic acid diglycidyl ester, isophthalic acid diglycidyl ester, terephthalic acid diglycidyl ester, p-hydroxybenzoic acid diglycidyl ester, tetrahydrophthalic acid diglycidyl ester, succinic acid diglycidyl ester, adipic acid diglycidyl ester, sebacic acid diglycidyl ester, and trimellitic acid triglycidyl ester; a glycidyl ether-based epoxy resin such as ethylene glycol diglycidyl ether, propylene glycol diglycidyl ether, 1,4-butanediol diglycidyl ether, 1,6-hexanediol diglycidyl ether, trimethylolpropane triglycidyl ether, pentaerythritol tetraglycidyl ether, tetraphenyl glycidyl ether ethane, triphenyl glycidyl ether ethane, a polyglycidyl ether of sorbitol, and a polyglycidyl ether of polyglycerol; a glycidyl amine-based epoxy resin such as triglycidyl isocyanurate and tetraglycidyl diaminodiphenylmethane; a linear aliphatic epoxy resin such as an epoxidized polybutadiene and an epoxidized soybean oil; a phosphorus-containing epoxy resin; a naphthalene skeleton-containing epoxy resin; an anthracene type epoxy resin; a tertiary butyl catechol type epoxy resin; a triphenylmethane type epoxy resin; a tetraphenylethane type epoxy resin; a biphenyl type epoxy resin; and the like. The epoxy resin (B) is not limited to these.

The preferable epoxy resin (B) is a bisphenol type epoxy resin, a novolak type epoxy resin, or an epoxy resin having an alicyclic skeleton.

When the epoxy resin (B) according to the present invention has two or more epoxy groups in one molecule, a crosslinked structure can be efficiently formed by a reaction with the modified polyolefin-based resin (A), and high heat resistance can be developed in the obtained cured product.

The adhesive composition of the present invention is characterized by containing two or more types of epoxy resins. Since two or more types of epoxy resins are contained, the adhesive composition can satisfy the adhesiveness to an adherend and heat resistance and dielectric properties of the cured product by virtue of a synergistic effect. In the present invention, this effect can be reliably obtained using two or more types of epoxy resins having two or more epoxy groups in one molecule.

Specifically, it is preferable to incorporate a novolak type epoxy resin in order to obtain an adhesive composition excellent in adhesiveness to an adherend, and it is preferable to incorporate an epoxy resin having an alicyclic skeleton in order to obtain an adhesive composition which gives a cured product excellent in dielectric properties. In addition, when these epoxy resins are used in combination, adhesiveness and dielectric properties become good synergistically. The novolak type epoxy resin is preferably a bisphenol A novolak type epoxy resin, and the epoxy resin having an alicyclic skeleton is preferably a dicyclopentadiene skeleton-containing epoxy resin.

In the present invention, the epoxy resin (B) for reliably obtaining the effect is as follows:

(1) an aspect in which an epoxy resin having an alicyclic skeleton and either one of a novolak type epoxy resin and a bisphenol type epoxy resin are used in combination, and the content proportions of the both are preferably 20% to 95% by mass and 5% to 80% by mass, and more preferably 30% to 85% by mass and 15% to 70% by mass, when the total content proportion of the both is 100% by mass; and (2) an aspect in which a novolak type epoxy resin and a bisphenol type epoxy resin are used in combination, and the content proportions of the both are preferably 20% to 95% by mass and 5% to 80% by mass, and more preferably 30% to 85% by mass and 15% to 70% by mass, when the total content proportion of the both is 100% by mass.

A proportion of the total content of the epoxy resin (B) contained in the adhesive composition of the present invention is in a range from 1 to 20 parts by mass, and preferably from 3 to 15 parts by mass based on 100 parts by mass of the modified polyolefin-based resin (A) from viewpoints of the adhesiveness to an adherend, and the heat resistance and dielectric properties of the cured product.

The adhesive composition of the present invention may contain (C) an imidazole-based compound having an alkoxysilyl group.

The imidazole-based compound is generally used as a curing agent for epoxy resins. When an adhesive composition containing the modified polyolefin-based resin (A), the epoxy resin (B), and the imidazole-based compound having an alkoxysilyl group (C) in combination is used in the present invention, the adhesiveness to a specifically gold-plated copper foil is improved. It is presumed that, since the alkoxysilyl group and the imidazole structure exhibit high affinity for both of gold and the modified polyolefin-based resin (A), the adhesiveness would be improved by the interaction. Further, it is presumed that, since the imidazole structure can also react with the epoxy resin (B), this excellent adhesiveness can be maintained, even in a case where a flexible copper-clad laminated board obtained by joining a polyimide film and a gold-plated copper foil using an adhesive composition containing the alkoxysilyl group-containing imidazole-based compound (C) is subjected to a reflow process.

The imidazole-based compound (C) having an alkoxysilyl group is preferably a compound represented by the following general formula (2) or an acid adduct thereof. An adhesive composition containing such a compound leads to sufficient effects above.

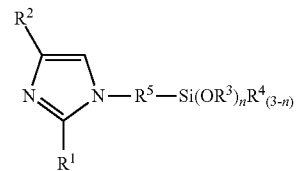

(In the formula, $R^1$ and $R^2$ are each independently one kind selected from a group consisting of a hydrogen atom, a substituted or unsubstituted alkyl group and a substituted or unsubstituted aryl group, $R^3$ and $R^4$ are each independently one kind selected from a group consisting of a hydrogen atom and a substituted or unsubstituted alkyl group, and at least one of $R^3$ is a substituted or unsubstituted alkyl group; n is 1 to 3; and $R^5$ is a divalent group in which an alkylene chain or a part of an alkylene chain is substituted by at least one of groups represented by the following formulas (3), (4), (5) and (6):

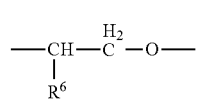

wherein, $R^6$ is a hydrogen atom or a hydroxy group.

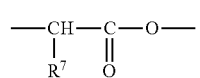

wherein $R^7$ is one kind selected from a hydrogen atom, a substituted or unsubstituted alkyl group and a substituted or unsubstituted aryl group.

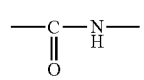

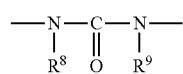

wherein $R^8$ and $R^9$ are each independently one kind selected from a hydrogen atom, a substituted or unsubstituted alkyl group and a substituted or unsubstituted aryl group.)

The imidazole-based compound having an alkoxysilyl group represented by the general formula (2) is a compound having both an imidazole group and an alkoxysilyl group in one molecule. Although the imidazole ring which constitutes an imidazole group may have substituents such as a saturated hydrocarbon group and an unsaturated hydrocarbon group, $R^1$ or $R^2$ of the alkoxysilyl group-containing imidazole-based compound of the general formula (2) is independently one kind selected from the group consisting of a hydrogen atom, a substituted or unsubstituted alkyl group, and a substituted or unsubstituted aryl group.

In the compound represented by the general formula (2), the alkoxysilyl group and the imidazole group are preferably bonded via a divalent group in which an alkylene chain having 1 to 10 carbon atoms or a part of the alkylene chain is substituted by at least one of the groups represented by formulas (3), (4), (5) and (6). Among the compounds represented by the general formula (2), compounds represented by the following general formulas (7) and (8) are preferred.

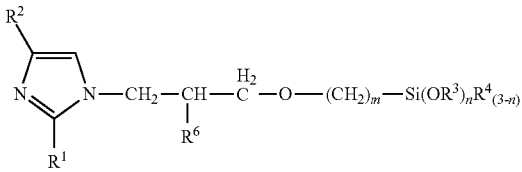

(7)

(In the formula, $R^1$ and $R^2$ are each independently one kind selected from the group consisting of a hydrogen atom, a substituted or unsubstituted alkyl group, and a substituted or unsubstituted aryl group, $R^3$ and $R^4$ are each independently one kind selected from the group consisting of a hydrogen atom and a substituted or unsubstituted alkyl group, at least one of $R^3$ is a substituted or unsubstituted alkyl group, and $R^6$ is a hydrogen atom or a hydroxy group; and m is 1 to 30, and n is 1 to 3.)

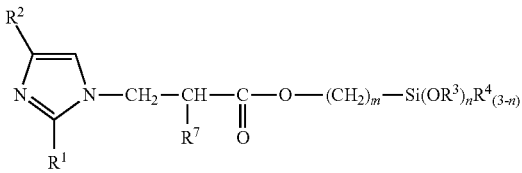

(8)

(In the formula, $R^1$ and $R^2$ are each independently one kind selected from the group consisting of a hydrogen atom, a substituted or unsubstituted alkyl group and a substituted or unsubstituted aryl group, $R^2$ and $R^4$ are each independently one kind selected from the group consisting of a hydrogen atom and a substituted or unsubstituted alkyl group, at least one of $R^3$ is a substituted or unsubstituted alkyl group, and $R^7$ is one kind selected from a hydrogen atom, a substituted or unsubstituted alkyl group, and a substituted or unsubstituted aryl group; and m is 1 to 30, and n is 1 to 3.)

Specific examples of the imidazole-based compound having an alkoxysilyl group (C) include 1-(2-hydroxy-3-trimethoxysilylpropoxypropyl)-imidazole, 1-(2-hydroxy-3-triethoxysilylpropoxypropyl)-imidazole, 1-(2-hydroxy-3-tripropoxysilylpropoxypropyl)-imidazole, 1-(2-hydroxy-3-tributoxysilylpropoxypropyl)-imidazole, 1-(2-hydroxy-3-triethoxysilylpropoxypropyl)-2-imidazole, 1-(2-hydroxy-3-triethoxysilylpropoxypropyl)-4-imidazole, 1-(3-oxo-4-trimethoxysilylpropoxypropyl)-imidazole, 1-trimethoxysilylpropylamino)-imidazole, and the like.

The compound represented by the general formula (2) can be obtained by a reaction of an imidazole compound such as imidazole, a 2-alkylimidazole, a 2,4-dialkylimidazole and 4-vinylimidazole with a 3-glycidoxyalkylsilane compound or the like. Not only the compound represented by the general formula (2), but also a salt or an acid adduct of this compound can be used as the imidazole-based compound having an alkoxysilyl group (C). Examples of the acid to be added include acetic acid, lactic acid, salicylic acid, benzoic acid, adipic acid, phthalic acid, citric acid, tartaric acid, maleic acid, trimellitic acid, phosphoric acid, isocyanuric acid, and the like. These acids may be used singly or in combination of two or more types thereof.

Further, a silanol compound produced by hydrolysis of the alkoxysilyl group of the compound represented by the general formula (2), a polyorganosiloxane compound produced by a dehydration condensation reaction of the silanol compound, and the like may also be used.

The compound represented by the general formula (7) can be obtained by a reaction of an imidazole compound such as imidazole, a 2-alkylimidazole, a 2,4-dialkylimidazole and 4-vinylimidazole with a 3-glycidoxypropylsilane compound such as a 3-glycidoxypropyltrialkoxysilane, a 3-glycidoxypropyldialkoxyalkylsilane and a 3-glycidoxypropylalkoxydialkylsilane, or other reaction. Among these, particularly preferred raw materials are imidazole and 3-glycidoxypropyltrimethoxysilane, and the reaction product is 1-(2-hydroxy-3-trimethoxysilylpropoxypropyl)-imidazole.

The compound represented by the general formula (8) can be obtained, for example, by a reaction of an imidazole compound with 3-methacryloyloxypropyltrimethoxysilane, or other reaction.

An adhesive composition containing the compound represented by the general formula (7) or an acid adduct thereof and the compound represented by the general formula (8) or an acid adduct thereof as the imidazole-based compound having an alkoxysilyl group (C) is a preferred composition which gives a cured product with good heat resistance. These compounds are preferred because they have good solubility in a solvent. The acid adducts of the compound represented by the general formula (7) are more preferable.

When the adhesive composition of the present invention contains the imidazole-based compound having an alkoxysilyl group (C), the content thereof is preferably in a range from 0.3 to 5.0 parts by mass, and more preferably from 0.5 to 3.0 parts by mass based on 100 parts by mass of a total content of the modified polyolefin-based resin (A) and the epoxy resin (B), from viewpoints of high adhesiveness to a gold-plated copper foil and reflow resistance. In the case of a low content of the alkoxysilyl group-containing imidazole-based compound (C), the adhesiveness of the adhesive composition of the present invention to a gold-plated copper foil and the reflow resistance decrease. On the other hand, in the case of too high a content of the alkoxysilyl group-containing imidazole-based compound (C), the storage stability of the adhesive composition may decrease.

The adhesive composition of the present invention may contain (D) an antioxidant, (E) a phosphorus-containing compound, (F) a conductive filler, and the like, according to the respective purposes.

Specific examples of the antioxidant (D) include a phenolic antioxidant such as 2,6-di-t-butyl-4-methylphenol, n-octadecyl-3-(3',5'-di-t-butyl-4'-hydroxyphenyl) propionate, and tetrakis [methylene-3-(3,5-di-t-butyl-4-hydroxyphenyl) propionate] methane; a sulfur-based antioxidant such as dilauryl-3,3'-thiodipropionate and dimyristyl-3,3'-dithiopropionate; a phosphorus-based antioxidant such as trisnonylphenyl phosphite and tris (2,4-di-t-butylphenyl) phosphite; and the like. These antioxidants may be used singly or in combination of two or more types thereof.

When the adhesive composition of the present invention contains the antioxidant (D), it is possible to suppress the oxidative decomposition of components contained in the adhesive composition of the present invention, and also to suppress the deterioration in dielectric properties of a cured product of the adhesive composition and the decrease in adhesiveness after soldering.

When the adhesive composition of the present invention contains the antioxidant (D), the content of the antioxidant (D) is preferably in a range from 0.1 to 10 parts by mass, and more preferably from 0.2 to 5 parts by mass, based on 100 parts by mass of a total content of the modified polyolefin-based resin (A) and the epoxy resin (B). Oxidation of the adhesive composition can be suppressed when the content of the antioxidant (D) falls within this range.

The phosphorus-containing compound (E) is a compound other than the phosphorus-based antioxidants indicated above. Specific examples thereof include melamine phosphate, melamine polyphosphate, guanidine phosphate, guanidine polyphosphate, ammonium phosphate, ammonium polyphosphate, ammonium phosphate amide, ammonium polyphosphate amide, carbamate phosphate, carbamate polyphosphate, aluminum trisdiethylphosphinate, aluminum trismethylethylphosphinate, aluminum trisdiphenylphosphinate, zinc bisdiethylphosphinate, zinc bismethylethylphosphinate, zinc bisdiphenylphosphinate, titanyl bisdiethylphosphinate, titanium tetrakisdiethylphosphinate, titanyl bismethylethylphosphinate, titanium tetrakismethylethylphosphinate, titanyl bisdiphenylphosphinate, titanium tetrakisdiphenylphosphinate, and the like. These compounds may be used singly or in combination of two or more types thereof.

The phosphorus-containing compound (E) has an effect of improving flame retardancy to the adhesive composition of the present invention. When the adhesive composition of the present invention contains the phosphorus-containing compound (E), the content of the phosphorus-containing compound (E) is not particularly limited as long as the properties thereof as an adhesive are not deteriorated, but is preferably in a range from 0.5 to 50 parts by mass, and more preferably from 1 to 30 parts by mass based on 100 parts by mass of a total content of the modified polyolefin-based resin (A) and the epoxy resin (B).

Specific examples of the conductive filler (F) include carbon black; a metal powder such as copper powder, aluminum powder and silver powder; and the like.

The conductive filler (F) has functions of improving heat resistance of the adhesive composition of the present invention and imparting conductivity to the adhesive layer. Therefore, the adhesive composition containing the conductive filler (F) can be used especially suitably as a conductive adhesive or a material for forming an electromagnetic shielding material.

When the adhesive composition of the present invention contains the conductive filler (F), the content thereof is preferably in a range from 10 to 350 parts by mass based on 100 parts by mass of a total content of the modified polyolefin-based resin (A) and the epoxy resin (B), from viewpoints of the heat resistance and conductivity of the adhesive layer. If the content is too high, the adhesiveness to a gold-plated copper foil or the like may not be sufficient.

The adhesive composition of the present invention may contain, to an extent that the following components do not affect the function of the adhesive composition, other thermoplastic resins, a tackifier, other flame retardants, a curing agent or curing accelerator other than the imidazole-based compound having an alkoxysilyl group (C), other fillers, a coupling agent, a leveling agent, an antifoaming agent, a pigment, a solvent and the like.

Examples of other thermoplastic resin include a phenoxy resin, a polyamide resin, a polyester resin, a polycarbonate resin, a polyphenylene oxide resin, a polyurethane resin, a polyacetal resin, a polyethylene-based resin, a polypropylene-based resin, a polyvinyl-based resin, and the like. These thermoplastic resins may be used singly or in combination of two or more types thereof.

Examples of the tackifier can include a coumarone-indene resin, a terpene resin, a terpene-phenol resin, a rosin resin, a p-t-butylphenol-acetylene resin, a phenol-formaldehyde resin, a xylene-formaldehyde resin, a petroleum-based hydrocarbon resin, a hydrogenated hydrocarbon resin, a turpentine-based resin, and the like. These tackifiers may be used singly or in combination of two or more types thereof.

Other flame retardants may be either an organic flame retardant or an inorganic flame retardant. Examples of the organic flame retardant include a triazine-based compound such as melamine, melam and melamine cyanurate; a nitrogen-based flame retardant such as a cyanuric acid compound, an isocyanuric acid compound, a triazole-based compound, a tetrazole compound, a diazo compound, and urea; a silicon-based flame retardant such as a silicone compound and a silane compound; and the like. Examples of the inorganic flame retardant include a metal hydroxide such as aluminum hydroxide, magnesium hydroxide, zirconium hydroxide, barium hydroxide, and calcium hydroxide; a metal oxide such as tin oxide, zirconium oxide, molybdenum oxide, and nickel oxide; zinc carbonate, magnesium carbonate, barium carbonate, zinc borate, a hydrated glass, and the like. These flame retardants may be used singly or in combination of two or more types thereof.

Examples of other curing agents include an amine-based curing agent, an acid anhydride-based curing agent, and the like. Examples of the amine-based curing agent include a melamine resin such as a methylated melamine resin, a butylated melamine resin, and a benzoguanamine resin; dicyandiamide, 4,4'-diphenyldiaminosulfone, and the like. Examples of the acid anhydride-based curing agent include an aromatic acid anhydride and an aliphatic acid anhydride. These curing agents may be used singly or in combination of two or more types thereof. When the adhesive composition of the present invention contains other curing agents, the content thereof is preferably in a range from 1 to 100 parts by mass, and more preferably from 5 to 70 parts by mass based on 100 parts by mass of the epoxy resin (B).

The curing accelerator is a component that accelerates a reaction between the modified polyolefin-based resin (A) and the epoxy resin (B). Examples thereof include an imidazole-based curing accelerator; a tertiary amine-based curing accelerator or a tertiary amine salt-based curing accelerator except the amine-based curing agent; and the like. These curing accelerators may be used singly or in combination of two or more types thereof.

Examples of the tertiary amine curing accelerator include benzyldimethylamine, 2-(dimethylaminomethyl) phenol, 2,4,6-tris(dimethylaminomethyl) phenol, tetramethylguanidine, triethanolamine, N,N'-dimethylpiperazine, triethylenediamine, 1,8-diazabicyclo [5.4.0] undecene, and the like.

Examples of the tertiary amine salt-based curing accelerator include a formate, an octylate, a p-toluenesulfonate, an o-phthalate, a phenol salt or a phenol novolak resin salt of 1,8-diazabicyclo [5.4.0] undecene; a formate, an octylate, a p-toluenesulfonate, an o-phthalate, a phenol salt or a phenol novolak resin salt of 1,5-diazabicyclo [4.3.0] nonene; and the like.

Examples of the imidazole-based curing accelerator include 2-methylimidazole, 2-undecylimidazole, 2-heptadecylimidazol, 1,2-dimethylimidazole, 2-methyl-4-ethylimidazole, 2-phenylimidazole, 2-phenyl-4-methylimidazole, 1-benzyl-2-methylimidazole, 1-benzyl-2-phenylimidazole, 2,4-diamino-6-[2'-methylimidazolyl-(1')]

ethyl-s-triazine, 2,4-diamino-6-[2'-undecylimidazolyl-(1')] ethyl-s-triazine, 2,4-diamino-6-[2'-ethyl-4'-methylimidazolyl-(1') ethyl-s-triazine, a 2,4-diamino-6-[2'-methylimidazolyl-(1')]ethyl-s-triazine isocyanuric acid adduct, a 2-phenylimidazole isocyanuric acid adduct, 2-phenyl-4,5-dihydroxymethyl imidazole, 2-phenyl-4-methyl-5-hydroxymethyl imidazole, and the like.

When the adhesive composition of the present invention contains a curing accelerator, the content of the curing accelerator is preferably in a range from 1 to 10 parts by mass, and more preferably from 2 to 5 parts by mass based on 100 parts by mass of the epoxy resin (B). When the content of the curing accelerator is within the above range, the adhesive composition is excellent in adhesiveness and heat resistance.

Examples of the coupling agent include a silane-based coupling agent such as vinyltrimethoxysilane, 3-glycidoxypropyltrimethoxysilane, p-styryltrimethoxysilane, 3-methacryloxypropylmethyldimethoxysilane, 3-acryloxypropyltrimethoxysilane, N-2-(aminoethyl)-3-aminopropylmethyldimethoxysilane, 3-ureidopropyltriethoxysilane, 3-mercaptopropylmethyldimethoxysilane, bis(triethoxysilylpropyl) tetrasulfide, 3-isocyanatopropyltriethoxysilane, and imidazole silane; a titanate-based coupling agent; an aluminate-based coupling agent; a zirconium-based coupling agent; and the like. These compounds may be used singly or in combination of two or more types thereof.

Specific examples of other fillers include an inorganic filler consisting of a powder made of calcium carbonate, aluminum oxide, magnesium oxide, aluminum nitride, titanium oxide, zinc oxide, talc, fumed silica, and other silicas; a resin filler consisting of a fluorine resin powder; and the like. The effect obtained by addition of other fillers is, for example, to improve heat resistance of the adhesive layer formed using the adhesive composition of the present invention. When a filler having relatively high thermal conductivity such as aluminum oxide, magnesium oxide and aluminum nitride is used, the thermal conductivity of the adhesive layer can be improved. Further, when a fumed silica is used, the coating properties of the adhesive composition can be improved.

Examples of the solvent include an alcohol such as methanol, ethanol, isopropyl alcohol, n-propyl alcohol, isobutyl alcohol, n-butyl alcohol, benzyl alcohol, ethylene glycol monomethyl ether, propylene glycol monomethyl ether, diethylene glycol monomethyl ether, and diacetone alcohol; a ketone such as acetone, methylethylketone, methylisobutylketone, methyl amylketone, cyclohexanone, and isophorone; an aromatic hydrocarbon such as toluene, xylene, ethylbenzene, and mesitylene; an ester such as methyl acetate, ethyl acetate, ethylene glycol monomethyl ether acetate, and 3-methoxy butyl acetate; an aliphatic hydrocarbon such as hexane, heptane, cyclohexane, and methyl cyclohexane; and the like. These solvents may be used singly or in combination of two or more types thereof. When the adhesive composition of the present invention is a solution or dispersion containing a solvent (resin varnish), it is possible to smoothly perform coating onto a substrate and formation of a coating film, and to easily obtain an adhesive layer having a desired thickness.

When the adhesive composition of the present invention contains a solvent, the content of the solvent is preferably in a range from 20% to 97% by mass, and more preferably from 50% to 90% by mass from viewpoints of workability including formation of the adhesive layer and the like. When the content of the solvent is within the above range, the viscosity of the solution is appropriate and the adhesive composition is easy to apply uniformly.

The adhesive composition of the present invention is preferably a composition in which the modified polyolefin-based resin (A) and the epoxy resin (B) are dissolved in a solvent, and the other components are dispersed or dissolved in this solution.

The adhesive composition of the present invention can be manufactured by mixing the modified polyolefin-based resin (A), the epoxy resin (B), and other components. A mixing method of the raw material components is not particularly limited as long as a uniform composition can be obtained.

The adhesive composition of the present invention is suitable for adhesion of two members made of the same material or different materials. The adhesive composition of the present invention is also suitable for manufacturing a product having a layer with adhesiveness (adhesive layer) on a surface of one member, that is, a laminate with an adhesive layer. In the latter case, a product (a coverlay film, a bonding sheet, etc.) having a layer with adhesiveness (adhesive layer) preferably in a B-stage state can be manufactured by applying a liquid adhesive composition containing a solvent to a surface of the member and drying the coating film at a temperature that does not cause curing of the coating film. When a member having the adhesive layer in a B-stage state and the other member are heated under preferable conditions, for example, to a temperature of 100° C. or higher under pressurization, an integrated product having sufficient adhesiveness can be manufactured.

In the present invention, when an adhesive composition containing no conductive components such as the conductive filler (F) is used to form an adhesive layer and then to produce a cured product by heating, the dielectric constant (s) of the cured product measured at a frequency of 1 GHz can be 2.5 or less, and the dielectric loss tangent (tan δ) thereof can be less than 0.01. Therefore, the adhesive composition of the present invention is suitable for the manufacture of FPC-related products excellent in dielectric properties. Moreover, it is preferable that the dielectric loss tangent (tan δ) of the adhesive cured product measured at a frequency of 1 GHz be less than 0.01. The dielectric constant and the dielectric loss tangent can be adjusted according to types of the modified polyolefin-based resin (A) and the epoxy resin (B) contained in the adhesive composition and the content proportions thereof, so that adhesive compositions of various constitutions can be set according to intended uses. Methods for measuring the dielectric constant and the dielectric loss tangent will be described later.

2. Coverlay Film

A coverlay film can be manufactured by forming an adhesive layer on one side of an electrically insulating base film using the adhesive composition of the present invention.

Examples of the resin contained in the base film include a polyimide, a polyetheretherketone, a polyphenylene sulfide, an aramid, a polyethylene naphthalate, a liquid crystal polymer, and the like. Among these, a polyimide, a polyethylene naphthalate and a liquid crystal polymer are preferred, and a polyimide is particularly preferred, from viewpoints of adhesiveness of the adhesive layer to the base film and dielectric properties. The coverlay film according to one embodiment of the present invention is characterized in that the adhesive layer obtained using the adhesive composition of the present invention is formed on one side of a polyimide film.

In a manufacturing method of the coverlay film of the present invention, for example, a coverlay film in which an adhesive layer in a B-stage state is formed can be manufactured by applying a solvent-containing adhesive composition (resin varnish) to a surface of a base film containing a polyimide or the like to form a coating film (resin varnish layer) and then removing a solvent from the coating film.

A thickness of the base film is not particularly limited, but is preferably in a range from 5 to 100 μm, more preferably from 5 to 50 and further preferably from 5 to 30 μm.

A temperature for removing the solvent is preferably in a range from 40° C. to 250° C., and more preferably from 70° C. to 170° C. The method for removing the solvent is not particularly limited. There is normally applied a method involving drying a coated film in a furnace where hot air heating, far infrared heating, high frequency induction heating or the like is performed. A thickness of the coating film after drying, i.e., the thickness of the adhesive layer, is preferably in a range from 5 to 45 μm, and more preferably from 10 to 35 μm.

The base film suitable for manufacturing the coverlay film of the present invention is commercially available. For example, "KAPTON (registered trademark)" manufactured by Du Pont-Toray Co., Ltd., "XENOMAX (registered trademark)" manufactured by Toyobo Co., Ltd., "UPILEX (registered trademark)-S" manufactured by Ube Industries, Ltd., "Apical (registered trademark)" manufactured by Kaneka Corporation, or the like can be used.

Moreover, when manufacturing other coverlay films, it is possible to use as the base film, for example, a polyethylene naphthalate film such as "TEONEX (registered trademark)" manufactured by Teijin DuPont Films Japan Limited, a liquid crystal polymer film such as "VECSTAR (registered trademark)" manufactured by Kuraray Co., Ltd. and "BIAC (registered trademark)" manufactured by Primatec Inc., or the like. The base film may also be obtained by forming the corresponding resin into a film having a desired thickness.

The coverlay film of the present invention may be provided with a releasable film layer on a surface of the adhesive layer according to need. In the case of forming the releasable film layer, a known releasable film is used such as a polyethylene terephthalate film, a polyethylene film, a polypropylene film, a silicone release treated paper, a polyolefin resin coated paper, a polymethylpentene (TPX) film, and a fluorine resin film. A coverlay film provided with the releasable film layer is useful for storage and the like because the adhesive layer is protected.

3. Bonding Sheet

The bonding sheet of the present invention is another aspect of the laminate with an adhesive layer.

The bonding sheet of the present invention is one in which an adhesive layer is formed on a surface of a releasable film using the adhesive composition of the present invention. The bonding sheet of the present invention may have an adhesive layer provided between two releasable films. The bonding sheet of the present invention is used after releasing a releasable film. The releasable film may be similar to one used for manufacturing the coverlay film of the present invention.

When the bonding sheet of the present invention is manufactured, there can be applied, for example, a method involving applying a solvent-containing adhesive composition (resin varnish) to a surface of a releasable film to form a coating film (resin varnish layer) and then removing the solvent from the coating film. When removing the solvent, the above-mentioned solvent removal method employed in the method for manufacturing the coverlay film of the present invention can be applied.

A thickness of the releasable film is not particularly limited, but is preferably in a range from 5 to 100 μm, more preferably from 5 to 50 μm, and further preferably from 5 to 30 μm.

A thickness of the adhesive layer in the bonding sheet of the present invention is preferably in a range from 5 to 100 μm, more preferably from 10 to 70 μm, and further preferably from 10 to 50 μm.

When the adhesive composition contains the conductive filler (F), a conductive bonding sheet provided with a conductive adhesive layer can be manufactured by using an adhesive composition (resin varnish) containing this conductive filler (F) and a solvent.

4. Copper-Clad Laminated Board

The copper-clad laminated board of the present invention is a laminate in which a polyimide film and a copper foil are bonded together using the adhesive composition of the present invention. That is, the copper-clad laminated board of the present invention is composed, in order, of a base film, an adhesive layer, and a copper foil. In the copper-clad laminated board of the present invention, the adhesive layer and the copper foil may be formed on both sides of the base film. That is, the copper-clad laminated board of the present invention may be a laminate provided with the adhesive layer and the copper foil sequentially on one side and the other side of the base film. The adhesive composition of the present invention is excellent in adhesiveness to an article containing copper, so the copper-clad laminated board of the present invention is excellent in stability as an integrated product. The adhesive layer contained in the copper-clad laminated board of the present invention may be composed of either a cured product or an uncured product.

A thickness of the adhesive layer in the copper-clad laminated board of the present invention is preferably 5 to 45 μm, and more preferably preferably from 10 to 35 μm.

When the copper-clad laminated board of the present invention is manufactured, there can be applied, for example, a method involving bringing the adhesive layer of the coverlay film of the present invention and a copper foil into surface contact, performing thermal lamination at a temperature from 80° C. to 150° C., and further performing after-curing to cure the adhesive layer. The conditions for the after-curing can be, for example, a temperature ranging from 100° C. to 200° C. for 30 minutes to 4 hours. The copper foil is not particularly limited, and an electrolytic copper foil, a rolled copper foil, or the like can be used.

5. Electromagnetic Shielding Material

The electromagnetic shielding material of the present invention is an article provided with an adhesive layer formed using the adhesive composition of the present invention. A preferred aspect in the present invention is an electromagnetic shielding material in which the adhesive layer contains the conductive filler (F). This can prevent malfunction of an electronic device due to noise of electromagnetic waves, leakage of confidential information due to interception of communication radio waves, and other failure.

When the electromagnetic shielding material of the present invention is manufactured, a method involving joining a shielding material and a conductive bonding sheet provided with an adhesive layer containing the conductive filler (F) can be applied.

EXAMPLES

The present invention is specifically described using Examples and Comparative Examples. The present invention is not limited to the following Examples.

1. Raw Materials
1-1. Modified Polyolefin-Based Resin (A)
Modified polyolefin-based resins a1 to a4 obtained by the following method were used.
(1) Modified Polyolefin-Based Resin a1
There were dissolved, in a toluene solvent, 100 parts by mass of a propylene-butene random copolymer manufactured using a metallocene catalyst as a polymerization catalyst and composed of 75 mol % of propylene unit and 25 mol % of butene unit, 22 parts by mass of a maleic anhydride and 6 parts by mass of di-t-butyl peroxide, and then the solution was warmed to 140° C. in a 1-L autoclave and stirred at this temperature for 3 hours. After that, the obtained reaction solution was cooled, and the reaction solution was poured into a container containing a large amount of methylethylketone to precipitate a resin. The remaining unreacted material or the like was separated and purified by centrifugation. Then, the collected resin was dried at 70° C. under reduced pressure for 5 hours to manufacture a modified polyolefin-based resin a1. The modified polyolefin-based resin a1 had a weight average molecular weight of 55,000 and an acid value of 30 mg KOH/g. Moreover, the content proportion of a graft portion constituting this modified polyolefin-based resin a1 was 5.2% by mass.

(2) Modified Polyolefin-Based Resin a2
There were dissolved, in a toluene solvent, 100 parts by mass of a propylene-butene random copolymer manufactured using a metallocene catalyst as a polymerization catalyst and composed of 75 mol % of propylene unit and 25 mol % of butene unit, 18 parts by mass of a maleic anhydride and 6 parts by mass of di-t-butyl peroxide, and then the solution was warmed to 140° C. in a 1-L autoclave and stirred at this temperature for 3 hours. After that, the obtained reaction solution was cooled, and the reaction solution was poured into a container containing a large amount of methylethylketone to precipitate a resin. The remaining unreacted material or the like was separated and purified by centrifugation. Then, the collected resin was dried at 70° C. under reduced pressure for 5 hours to manufacture a modified polyolefin-based resin a2. The modified polyolefin-based resin a2 had a weight average molecular weight of 65,000 and an acid value of 20 mg KOH/g. Moreover, the content proportion of a graft portion constituting this modified polyolefin-based resin a2 was 3.5% by mass.

(3) Modified Polyolefin-Based Resin a3
Kneaded and reacted were 100 parts by mass of a propylene-ethylene random copolymer manufactured using a metallocene catalyst as a polymerization catalyst and composed of 97 mol % of propylene unit and 3 mol % of ethylene unit, 1.5 parts by mass of a maleic anhydride, 0.8 part by mass of lauryl methacrylate and 1.2 parts by mass of di-t-butyl peroxide using a twin-screw extruder in which the maximum temperature of the cylinder part was set to 170° C. Thereafter, degassing was performed under reduced pressure in the extruder to remove the remaining unreacted material, thereby manufacturing a modified polyolefin-based resin a3. The modified polyolefin-based resin a3 had a weight average molecular weight of 130,000 and an acid value of 15 mg KOH/g. Moreover, the content proportion of a graft portion constituting this modified polyolefin-based resin a3 was 2.6% by mass.

(4) Modified Polyolefin-Based Resin a4
Kneaded and reacted were 100 parts by mass of a hydrogenated styrene butadiene block copolymer "TUFTEC H1052" (trade name) manufactured by Asahi Kasei Corporation, 1.5 parts by mass of a maleic anhydride, 0.8 part by mass of lauryl methacrylate, and 1.2 parts by mass of di-t-butyl peroxide using a twin-screw extruder in which the maximum temperature of the cylinder part was set to 170° C. Thereafter, degassing was performed under reduced pressure in the extruder to remove the remaining unreacted material, thereby manufacturing a modified polyolefin-based resin a4. The modified polyolefin-based resin a4 had a weight average molecular weight of 60,000 and an acid value of 15 mg KOH/g. Moreover, the content proportion of a graft portion constituting this modified polyolefin-based resin a4 was 2.6% by mass.

1-2. Epoxy Resin (B)
(1) Epoxy Resin b1
Bisphenol A novolak type epoxy resin "EPICLON N-865" (trade name) manufactured by DIC Corporation
(2) Epoxy Resin b2
Dicyclopentadiene skeleton-containing epoxy resin "EPICLON HP-7200" (trade name) manufactured by DIC Corporation
(3) Epoxy Resin b3
Cresol novolak type epoxy resin "EOCN-102S" (trade name) manufactured by Nippon Kayaku Co., Ltd.
(4) Epoxy Resin b4
Bisphenol A type epoxy resin "JER 828" (trade name) manufactured by Mitsubishi Chemical Corporation 1-3. Imidazole-Based Compound Having Alkoxysilyl Group (C)
(1) Imidazole-Based Compound c1
1-(2-Hydroxy-3-trimethoxysilylpropoxypropyl)-imidazole
(2) Imidazole-Based Compound c2
Acetic acid adduct of imidazole-based compound c1

1-4. Antioxidant (D)
Phenolic antioxidant "ADEKASTAB A330" (trade name) manufactured by Adeka Corporation 1-5. Phosphorus-Containing Compound (E)
Aluminum dimethylphosphinate "Exolit OP935" (trade name) manufactured by CLARIANT 1-6. Conductive Filler (F)
Copper powder "FCC-115A" (trade name) manufactured by Fukuda Metal Foil & Powder Co., Ltd.

1-7. Curing Accelerator
Imidazole-based curing accelerator "CUREZOL C11-Z" (trade name) manufactured by Shikoku Chemicals Corporation 1-8. Other Fillers
Fumed Silica "AEROSIL R974" (trade name) (average particle size: 12 nm) manufactured by Nippon Aerosil Co., Ltd.

1-9. Solvent
Mixed solvent composed of methylcyclohexane, toluene, methylethylketone and methanol (mass ratio=270:180:5:2)

Examples 1 to 14 and Comparative Examples 1 to 4

The raw materials were added to a flask equipped with a stirrer in the proportions indicated in Table 1 and stirred for 6 hours under warming at 60° C. to dissolve component (A), component (B), component (C), component (D) and a curing accelerator in a solvent and to disperse component (E), component (F) and the other fillers therein, thereby manufacturing liquid adhesive compositions of Examples 1 to 14 and Comparative Examples 1 to 4.
Using all these liquid adhesive compositions, coverlay films, bonding sheets, and adhesive test pieces A and B were prepared to make evaluation for the following items (i) to (v). Moreover, liquid adhesive compositions (without a conductive filler) were manufactured using the components, except component (F), of the liquid adhesive compositions of Examples 1 to 14 and Comparative Examples 1 to 4, and evaluation was made for the following item (vi).

(1) Preparation of Coverlay Film

The respective liquid adhesive compositions were roll-coated onto a surface of a polyimide film having a thickness of 25 μm so that the thickness after drying reached 40 μm, and dried at 140° C. for 2 minutes, thereby producing a coverlay film having an adhesive layer.

(2) Preparation of Adhesive Test Piece A

A gold-plated copper foil having a thickness of 35 μm was prepared. Then, the copper foil was overlaid so that the gold-plated surface was in contact with the adhesive layer surface of the respective coverlay films, and lamination was performed under conditions of 150° C., 0.3 MPa and 1 m/min. The resulting laminates (polyimide film/adhesive layer/gold-plated copper foil) were pressure-bonded by heating under the conditions of 150° C. and 3 MPa for 5 minutes, and then further subjected to after-curing at 160° C. for 2 hours in an oven, thereby producing adhesive test pieces A.

(3) Preparation of Bonding Sheet

A releasable PET film having a thickness of 35 μm was prepared. Then, the respective liquid adhesive compositions were roll-coated onto a surface of the releasable PET film so that the thickness after drying reached 25 μm, and dried at 140° C. for 2 minutes, thereby producing bonding sheets having an adhesive layer.

(4) Preparation of Adhesive Test Piece B

A nickel-plated SUS304 plate having a thickness of 300 μm was prepared, and overlaid so that the nickel-plated surface was in contact with the adhesive layer of the respective bonding sheets, and lamination was performed under conditions of 150° C., 0.3 MPa and 1 m/min., thereby producing laminates X (SUS304 plate/bonding sheet).

On the other hand, prepared was a flexible printed wiring board provided with a polyimide film having a thickness of 25 μm, a copper circuit pattern formed on a surface on one side of the polyimide film, and a coverlay film part (polyimide layer having a thickness of 25 μm) covering the circuit pattern by bringing the adhesive layer into contact with the circuit pattern. A through hole having a diameter of 1 mm is formed in the coverlay film part covering the circuit pattern, and the copper circuit pattern is exposed through the through hole.

The releasable PET film was peeled off from the respective laminates X so that the adhesive layer adhered to the SUS304 plate was brought into full contact with the surface of the flexible printed wiring board on the side of the coverlay film part for pressure-bonding under conditions of 150° C. and 3 MPa for 5 minutes. Then, after-curing was further performed at 160° C. for 2 hours in an oven, thereby preparing adhesive test pieces B (SUS 304 plate/adhesive layer/flexible printed wiring board).

(i) Peel Adhesion Strength

In order to evaluate the adhesiveness, a 180° peel adhesion strength (N/mm) when the gold-plated copper foil of each of the adhesive test piece A was peeled off from the polyimide film was measured in accordance with JIS C 6481 "Test method for copper-clad laminated board for printed wiring board" under conditions: a temperature of 23° C. and a tensile speed of 50 mm/min. The width of each of the adhesive test pieces at the time of measurement was set to 10 mm.

(ii) Solder Heat Resistance

Test was conducted under the following conditions in accordance with JIS C 6481.

The respective adhesive test pieces A were floated in a solder bath at 260° C. for 60 seconds, with the surface of the polyimide film facing up, to visually evaluate the presence or absence of an appearance abnormality such as swelling or peeling of the adhesive layer. As a result, those in which an appearance abnormality such as swelling or peeling was not confirmed were shown as "o", and those in which an appearance abnormality such as swelling or peeling was confirmed were shown as "x".

Furthermore, the test pieces taken out of the solder bath were subjected to 180° peel adhesion strength (N/cm) measurement when the polyimide film was peeled off from the gold-plated copper foil at 23° C. according to JIS C 6481. The width of the respective adhesive test pieces at the time of measurement was set to 10 mm, and the tensile speed was set to 50 mm/min.

(iii) Flame Retardancy

The coverlay film was cured at 160° C. for 2 hours to evaluate the flame retardancy according to UL-94. Those that passed the test (VTM-0 class) were shown as "o", and those that failed the test were shown as "x".

(iv) Conductivity (Connection Resistance)

A connection resistance value between the SUS plate of the respective adhesive test pieces B (SUS plate/adhesive layer/flexible printed wiring board) and the copper portion of the circuit pattern of the flexible printed wiring board was measured by a resistance value measuring device. As a result, those having a connection resistance value of less than 1Ω were shown as "o", those having a connection resistance value of 1Ω to 3Ω were shown as "Δ", and those having a connection resistance value of more than 3Ω were shown as "x".

(v) Conductivity after Soldering (Connection Resistance)

The respective adhesive test piece B was floated in a solder bath at 260° C. for 60 seconds. Thereafter, a connection resistance value between the SUS plate of the respective adhesive test pieces B taken out of the solder bath and the copper portion of the circuit pattern of the flexible printed wiring board was measured by a resistance value measuring device. As a result, those having a connection resistance value of less than 1Ω were shown as "o", those having a connection resistance value of 1 to 3Ω were shown as "Δ", and those having a connection resistance value of more than 3Ω were shown as "x".

(vi) Dielectric Properties (Dielectric Constant and Dielectric Loss Tangent)

The respective liquid adhesive compositions (without a conductive filler) were roll-coated onto a surface of a releasable polyethylene terephthalate film having a thickness of 38 μm. Subsequently, the coated film was allowed to stand in an oven, and the coating film was dried at 120° C. for 3 minutes to form a coating (adhesive layer), thereby producing a bonding sheet. After that, the bonding sheets were allowed to stand in an oven and heated at 180° C. for 30 minutes. The releasable film was then peeled off to prepare cured test pieces for evaluation of the dielectric properties.

The dielectric constant ($\varepsilon$) and the dielectric loss tangent (tan $\delta$) of a cured test piece having a size of 15 mm×80 mm×50 μm were measured by a split post dielectric resonator method (SPDR method) using "Network Analyzer 85071 E-300" manufactured by Agilent Technologies at a temperature of 23° C. and a frequency of 1 GHz.

TABLE 1

|  |  |  | Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Raw material (parts by mass) | (A) Modified polyolefin-based resin | a1 | 100 | 100 | 100 | 100 |  |  |  | 100 | 100 | 100 |
|  |  | a2 |  |  |  |  | 100 |  |  |  |  |  |
|  |  | a3 |  |  |  |  |  | 100 |  |  |  |  |
|  |  | a4 |  |  |  |  |  |  | 100 |  |  |  |
|  | (B) Epoxy resin | b1 | 5 |  |  |  | 5 | 5 | 5 | 5 | 5 | 5 |
|  |  | b2 | 10 | 10 | 10 |  | 10 | 10 | 10 | 10 | 10 | 10 |
|  |  | b3 |  | 5 |  |  |  |  |  |  |  |  |
|  |  | b4 |  |  | 5 | 10 |  |  |  |  |  |  |
|  | (C) Alkoxysilyl group-containing imidazole-based compound | c1 |  | 1 | 1 | 1 | 1 | 1 | 1 |  |  | 1 |
|  |  | c2 |  |  |  |  |  |  |  | 1 |  |  |
|  | (D) Antioxidant |  | 1 | 1 | 1 | 1 | 1 | 1 | 1 | 1 | 1 | 1 |
|  | (E) Phosphorus-containing compound |  | 10 | 10 | 10 | 10 | 10 | 10 | 10 | 10 | 10 |  |
|  | (F) Conductive filler |  | 30 | 30 | 30 | 30 | 30 | 30 | 30 | 30 | 30 | 30 |
|  | Curing accelerator |  | 0.3 | 0.3 | 0.3 | 0.3 | 0.3 | 0.3 | 0.3 | 0.3 | 0.3 | 0.3 |
|  | Other fillers (silica) |  | 10 | 10 | 10 | 10 | 10 | 10 | 10 | 10 | 10 | 10 |
|  | Solvent |  | 300 | 300 | 300 | 300 | 300 | 300 | 300 | 300 | 300 | 300 |

|  |  |  | Example | | | | Comparative Example | | | |
|---|---|---|---|---|---|---|---|---|---|---|
|  |  |  | 11 | 12 | 13 | 14 | 1 | 2 | 3 | 4 |
| Raw material (parts by mass) | (A) Modified polyolefin-based resin | a1 | 100 | 100 | 100 | 100 | 100 | 100 | 100 | 100 |
|  |  | a2 |  |  |  |  |  |  |  |  |
|  |  | a3 |  |  |  |  |  |  |  |  |
|  |  | a4 |  |  |  |  |  |  |  |  |
|  | (B) Epoxy resin | b1 | 5 | 5 | 5 | 5 | 15 |  |  |  |
|  |  | b2 | 10 | 10 | 10 | 10 |  | 15 |  |  |
|  |  | b3 |  |  |  |  |  |  | 15 |  |
|  |  | b4 |  |  |  |  |  |  |  |  |
|  | (C) Alkoxysilyl group-containing imidazole-based compound | c1 |  | 1 | 1 | 1 | 1 | 1 | 1 | 1 |
|  |  | c2 |  |  |  |  |  |  |  |  |
|  | (D) Antioxidant |  | 1 | 1 | 1 |  | 1 | 1 | 1 | 1 |
|  | (E) Phosphorus-containing compound |  | 10 | 10 | 10 | 10 | 10 | 10 | 10 | 10 |
|  | (F) Conductive filler |  | 150 | 350 |  | 30 | 30 | 30 | 30 | 30 |
|  | Curing accelerator |  | 0.3 | 0.3 | 0.3 | 0.3 | 0.3 | 0.3 | 0.3 | 0.3 |
|  | Other fillers (silica) |  | 10 | 10 | 10 | 10 | 10 | 10 | 10 | 10 |
|  | Solvent |  | 300 | 300 | 300 | 300 | 300 | 300 | 300 | 300 |

The evaluation results are indicated in Table 2.

TABLE 2

|  |  |  | Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Adhesiveness | Initial | Peel strength (N/cm) | 9 | 9 | 8 | 9 | 9 | 9 | 6 | 9 | 7 | 9 |
|  | After soldering | Peel strength (N/cm) | 10 | 7 | 5 | 6 | 9 | 7 | 5 | 10 | 5 | 10 |
|  |  | Appearance | ○ | ○ | Δ | Δ | ○ | Δ | ○ | ○ | Δ | ○ |
| Flame retardancy |  |  | ○ | ○ | ○ | ○ | ○ | ○ | ○ | ○ | ○ | x |
| Conductivity | Initial |  | ○ | ○ | ○ | ○ | ○ | ○ | ○ | ○ | ○ | ○ |
|  | After soldering |  | ○ | ○ | Δ | Δ | ○ | ○ | ○ | ○ | ○ | ○ |
| Dielectric properties | Dielectric constant (s) |  | 2.4 | 2.4 | 2.4 | 2.5 | 2.4 | 2.4 | 2.5 | 2.4 | 2.4 | 2.4 |
|  | Dielectric loss tangent (tan δ) |  | 0.004 | 0.003 | 0.005 | 0.004 | 0.004 | 0.004 | 0.004 | 0.004 | 0.004 | 0.004 |

TABLE 2-continued

|  |  |  | Example | | | | Comparative Example | | | |
| --- | --- | --- | --- | --- | --- | --- | --- | --- | --- | --- |
|  |  |  | 11 | 12 | 13 | 14 | 1 | 2 | 3 | 4 |
| Adhesiveness | Initial | Peel strength (N/cm) | 8 | 6 | 10 | 9 | 9 | 8 | 8 | 5 |
|  | After soldering | Peel strength (N/cm) | 8 | 5 | 9 | 7 | 10 | 2 | 5 | 1 |
|  |  | Appearance | ○ | ○ | ○ | Δ | ○ | x | Δ | x |
| Flame retardancy |  |  | ○ | ○ | ○ | ○ | ○ | ○ | ○ | ○ |
| Conductivity | Initial |  | ○ | ○ | x | ○ | ○ | ○ | ○ | Δ |
|  | After soldering |  | ○ | ○ | x | Δ | ○ | x | x | x |
| Dielectric properties | Dielectric constant (s) |  | 2.4 | 2.4 | 2.4 | 2.5 | 2.7 | 2.3 | 2.6 | 2.3 |
|  | Dielectric loss tangent (tan δ) |  | 0.004 | 0.004 | 0.004 | 0.005 | 0.008 | 0.003 | 0.007 | 0.003 |

From the results indicated in Table 2, the following matter is clarified.

The adhesive compositions of Examples 1 to 14 were all excellent in adhesiveness to a gold-plated copper foil. Among these, Examples 1 and 8 are examples of an adhesive composition containing an imidazole-based compound having an alkoxysilyl group (C), and were excellent in adhesiveness to a gold-plated copper foil and reflow resistance as compared with Example 9 not containing this.

On the other hand, Comparative Examples 1 to 3 are compositions containing only one kind of epoxy resin, and thus were inferior in either or both of reflow resistance and dielectric properties, and Comparative Example 4 containing no epoxy resin was insufficient in reflow resistance.

In addition, the adhesive compositions (without a conductive filler) of Examples 1 to 14 were all excellent in dielectric properties of the cured product.

INDUSTRIAL APPLICABILITY

The adhesive composition of the present invention is excellent in adhesiveness to an adherend such as a resin film or a gold-plated copper foil and dielectric properties of a cured product, and also excellent in solder heat resistance. Furthermore, the cured product obtained using the adhesive composition containing a conductive filler is excellent also in conductivity. Therefore, the adhesive composition of the present invention is suitable for the manufacture of a coverlay film, a flexible copper-clad laminated board, a bonding sheet, a conductive bonding sheet, an electromagnetic shielding material and the like.

The invention claimed is:

1. An adhesive composition, comprising:
(A) a modified polyolefin-based resin; and
(B) an epoxy resin,
wherein the modified polyolefin-based resin (A) is a resin in which a polyolefin resin is graft-modified with a modifier comprising an α, β-unsaturated carboxylic acid or a derivative thereof,
a content of the epoxy resin (B) is in a range of from 1 to 20 parts by mass based on 100 parts by mass of the modified polyolefin-based resin (A), and
the epoxy resin (B) consists of two or more different epoxy resins selected from the group consisting of bisphenol epoxy resins, novolak epoxy resins, and epoxy resins having an alicyclic skeleton.

2. The adhesive composition of claim 1, wherein the epoxy resin (B) comprises a novolak epoxy resin.

3. The adhesive composition of claim 2, wherein the epoxy resin (B) comprises a bisphenol A novolak epoxy resin.

4. The adhesive composition of claim 1, wherein the epoxy resin (B) comprises an epoxy resin having an alicyclic skeleton.

5. The adhesive composition of claim 1, wherein the modified polyolefin-based resin (A) comprises a modified polypropylene resin.

6. The adhesive composition of claim 1, wherein the derivative of the α,β-unsaturated carboxylic acid is at least one compound selected from the group consisting of an itaconic anhydride, a maleic anhydride, an aconitic anhydride and a citraconic anhydride.

7. The adhesive composition of claim 1, wherein a content proportion of a graft portion derived from the α, β-unsaturated carboxylic acid or the derivative thereof is in a range of from 0.1% to 20% by mass based on 100% by mass of the modified polyolefin-based resin (A).

8. The adhesive composition of claim 1, further comprising (C) an imidazole-based compound comprising an alkoxysilyl group, wherein a content of the alkoxysilyl group-comprising imidazole-based compound (C) is in a range of from 0.3 to 5 parts by mass based on 100 parts by mass of a total content of the modified polyolefin-based resin (A) and the epoxy resin (B).

9. The adhesive composition of claim 1, further comprising (D) an antioxidant, wherein a content of the antioxidant (D) is in a range of from 0.1 to 10 parts by mass based on 100 parts by mass of a total content of the modified polyolefin-based resin (A) and the epoxy resin (B).

10. The adhesive composition of claim 1, further comprising (E) a phosphorus-containing compound (E), wherein a content of the phosphorus-containing compound (E) is in a range of from 0.5 to 50 parts by mass based on 100 parts by mass of a total content of the modified polyolefin-based resin (A) and the epoxy resin (B).

11. The adhesive composition of claim 1, further comprising (F) a conductive filler, wherein a content of the conductive filler (F) is in a range of from 10 to 350 parts by mass based on 100 parts by mass of a total content of the modified polyolefin-based resin (A) and the epoxy resin (B).

12. A coverlay film, comprising an adhesive layer formed using the adhesive composition of claim 1, the adhesive layer being formed on one side of a polyimide film.

13. A bonding sheet, comprising an adhesive layer formed using the adhesive composition of claim 1, the adhesive layer being formed on a surface of a releasable film.

14. A copper-clad laminated board, comprising an adhesive layer formed using the adhesive composition of claim 1, the adhesive layer being provided between a copper foil and at least one side of a polyimide film.

15. An electromagnetic shielding material, comprising an adhesive layer formed using the adhesive composition of claim 1 as an element.

* * * * *